United States Patent
Ma et al.

(10) Patent No.: US 8,838,181 B2
(45) Date of Patent: Sep. 16, 2014

(54) COMMUNICATION DEVICE FOR AUTOMATICALLY SWITCHING ITS COMMUNICATION MODES AND OPERATING METHOD THEREOF

(75) Inventors: Yue-Bo Ma, Nanjing (CN); Yang Liu, Nanjing (CN)

(73) Assignees: Inventec Appliances (Pudong) Corporation, Shanghai (CN); Inventec Appliances Corp., New Taipei (TW); Inventec Appliances (Jiangning) Corporation, Nanjing (CN)

(*) Notice: Subject to any disclaimer, the term of this patent is extended or adjusted under 35 U.S.C. 154(b) by 245 days.

(21) Appl. No.: 13/557,208

(22) Filed: Jul. 25, 2012

(65) Prior Publication Data
US 2013/0029721 A1 Jan. 31, 2013

(30) Foreign Application Priority Data
Jul. 25, 2011 (CN) .......................... 2011 1 0225297

(51) Int. Cl.
*H04M 1/60* (2006.01)
*H04W 88/02* (2009.01)
*H04M 1/725* (2006.01)

(52) U.S. Cl.
CPC .......... *H04M 1/72569* (2013.01); *H04M 1/605* (2013.01)

USPC ...................... 455/566; 455/569.1; 455/575.1

(58) Field of Classification Search
USPC ............... 455/550.1, 556.1, 566, 569.1, 570, 455/575.1, 90.1, 347, 351; 345/169, 172, 345/175
See application file for complete search history.

(56) References Cited

U.S. PATENT DOCUMENTS

| 7,196,316 | B2 * | 3/2007 | Chan et al. ................. 455/575.3 |
| 7,522,065 | B2 * | 4/2009 | Falcon ........................ 455/569.1 |
| 2014/0092068 | A1 * | 4/2014 | Zheng et al. ................. 345/175 |

* cited by examiner

*Primary Examiner* — Thanh Le
(74) *Attorney, Agent, or Firm* — Novak Druce Connolly Bove + Quigg LLP

(57) ABSTRACT

The invention provides a communication device for automatically switching its communication modes and an operating method thereof. The communication device includes a photodetector module, a processing module, and a coder-decoder (CODEC) module. The photodetector module is configured to sense variation of light from an object to obtain an optical signal, and is configured to convert the optical signal to an electric current signal, wherein the light varies with a position of the object from the communication device. The processing module is connected to the photodetector module and is configured to direct the CODEC module to switch between audio channels of the communication device according to the electric current signal so as to change a communication mode of the communication device in a phone call.

12 Claims, 5 Drawing Sheets

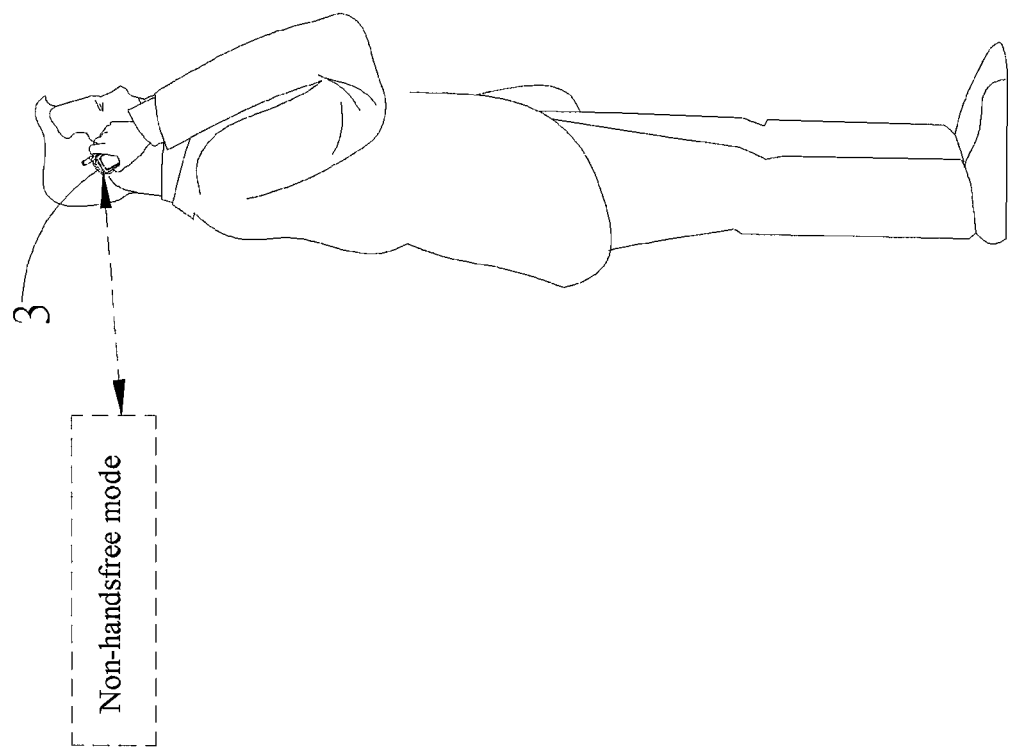

COMMUNICATION DEVICE FOR AUTOMATICALLY SWITCHING ITS COMMUNICATION MODES AND OPERATING METHOD THEREOF

CROSS-REFERENCE TO RELATED APPLICATION

This application claims the priority benefit of China application serial no. 201110225297.8, filed on Jul. 25, 2011. The entirety of the above-mentioned patent application is hereby incorporated by reference herein and made a part of this specification.

BACKGROUND OF THE INVENTION

1. Field of the Invention

The invention relates to a communication device for automatically switching its communication modes and a method of operating the communication device for automatically switching its communication modes, and, in particular, relates to a communication device for automatically switching between a non-handsfree mode and a handsfree mode during a phone call through a photodetector detecting how far away from or close to a mobile phone and an operating method thereof.

2. Description of Related Art

In recent years, photodetectors are widely applied in mobile phone operating platforms such as android operating platforms. The photodector senses ambient light sources or a distance from an object to perform controlling mobile phone functions. Currently, the major application of photodectors on the mobile phone may be adjustment of brightness of the display screen according to variation of ambient light source strength, or controlling on turning on or off on backlight of the display screen or the keyboard according to how far or how close the user is from the mobile phone. Apart from the aforementioned applications, there are no other applications discovered so far.

However, making a phone call is one of major functions of the mobile phone. With regard with current mobile phones in the market, have it is required to manually switch between handsfree communication mode and non-handsfree mode. Thus, when a user makes a phone call, if the user needs to check information in the mobile phone during in the phone call, the user needs to manually switch the current communication mode to a handsfree mode, so as to simultaneously continue the phone call and check the data in the mobile phone. This operation is quite inconvenient.

SUMMARY OF THE INVENTION

In view of the aforementioned technical problems in the conventional art, an object of the invention is to provide a communication device for automatically switching its communication modes and a method of operating the communication device for automatically switching its communication modes, to solve the problems of not being able to automatically switch between a non-handsfree mode and a handsfree mode of the communication device e.g. in a phone call.

According to an object of the invention, the invention provides a communication device for automatically switching its communication modes. The communication device includes a photodetector module, a processing module and a coder-decoder (CODEC) module. The photodetector module is configured to sense variation of light from an object to obtain an optical signal, and is configured to convert the optical signal to an electric current signal, where the light varies with a position of the object from the communication device. The processing module is connected to the photodetector module and is configured to direct the coder-decoder (CODEC) module to switch between audio channels of the communication device according to the electric current signal so as to change a communication mode of the communication device in a phone call.

In an embodiment, the communication mode includes a handsfree mode or a non-handsfree mode. Further, the processing module may be configured to determine whether the electric current signal has a value greater than a predetermined electric current value. If it's determined that the value is greater than the predetermined value, the processing module may be configured to change the communication mode to the handsfree mode. If it's determined that the value is not greater than the predetermined value, the processing module may be configured to change the communication mode to the non-handsfree mode. Also, the communication device may further include a setting module connected to the processing module and providing a user with a function of setting the predetermined value.

In an embodiment, the communication device further includes a switching module connected to the processing module and enabling a user to turn on or off the communication device's function of automatically switching its communication modes.

According to an object of the invention, the invention also provides a method of operating the communication device for automatically switching its communication modes. The method of operating the communication device includes sensing variation of light from an object to obtain an optical signal, and then converting the optical signal to an electric current signal, wherein the light varies with a position of the object from the communication device; and directing a coder-decoder (CODEC) module of the communication device to switch between audio channels of the communication device according to the electric current signal so as to change a communication mode of the communication device in a phone call.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3B is a second schematic diagram of a communication device having functions of automatically switching its communication modes and an operating method thereof according to an embodiment of the invention.

DETAILED DESCRIPTION OF DISCLOSED EMBODIMENTS

Figure 1:
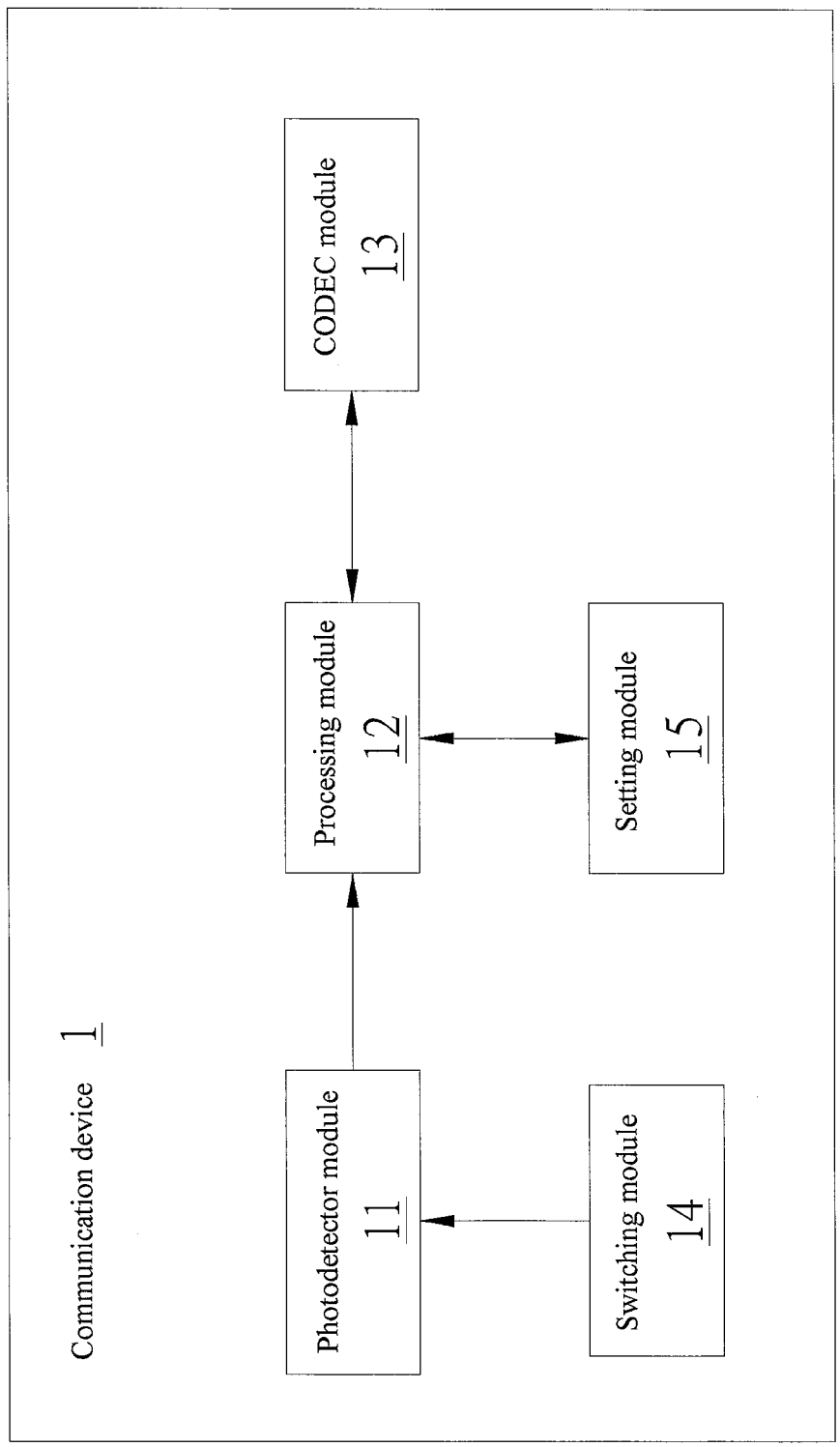
FIG. 1 is a functional block diagram of a communication device having functions of automatically switching its communication modes according to an embodiment of the invention.

Some embodiments of the present application will now be described more fully hereinafter with reference to the accompanying drawings, in which some, but not all embodiments of the application are shown. Indeed, various embodiments of the application may be embodied in many different forms and should not be construed as limited to the embodiments set forth herein; rather, these embodiments are provided so that this disclosure will satisfy applicable legal requirements. Like reference numerals refer to like elements throughout.

Referring to FIG. 1, FIG. 1 is a functional block diagram of a communication device having functions of automatically switching its communication modes according to an embodiment of the invention. In FIG. 1, a communication device 1 includes a photodetector module 11, a processing module 12, a coder-decoder (CODEC) module 13, a switching module 14 and a setting module 15. The photodetector module 11 is electrically connected to the processing module 12 and the switching module 14. The processing module 12 is further connected to the CODEC module 13 and the setting module 15. The communication device 1 may be a mobile phone which may be an electronic device capable of performing communication. The photodetector module 11 may be, for example, a photosensitive resistor, a photodiode, a photodetector integrated circuit (IC) and so like. The switching module 14 may be a switching button configured external to the communication device 1, or may be a switching software unit disposed in the communication device 1. In the present embodiment, the CODEC module 13 may perform functions of decoding received audio packets from the base station and outputs the decoded audio signal to the speaker (not shown) of the communication device 1. Additionally, the CODEC module 13 may perform functions of encoding audio signals generated by the user talking into audio packets, and transmits the encoded audio packets to the base station through relevant transceiver circuit (not shown) of the communication device 1.

In the aforementioned descriptions, when the user is in a phone call using the communication device 1, the photodetector module 11 can sense variation of light when the user is close to or away from the communication device 1 so as to obtain an optical signal. Then, the photodetector module 11 converts the optical signal to an electric current signal. Further, the processing module 12 may determine if the electric current signal has a value greater than a predetermined electric current value so as to determine the current communication mode of the communication device 1. If the electric current signal has a value greater than a predetermined electric current value, the processing module 12 controls the CODEC module 12 to perform switching its audio channels, so as to change the communication mode of the communication device to a handsfree mode. If the electric current signal has a value less than a predetermined electric current value, the processing module 12 controls the CODEC module 12 to perform switching its audio channels, so as to change the communication mode of the communication device to a non-handsfree mode. Thereby, the function of automatically switching the communication modes of the communication device is achieved. It is noted that when the communication device is in the handsfree mode, the communication device outputs its audio signal with large volume from speakers and receive input audio signal with greater level amplification. On the other hand, the non-handsfree mode may be referred to a situation where the audio signal of the communication device is output from earpiece speaker with relative small volume where the user has to put his/her own ear close to the earpiece speaker in order to listen to the output audio signal. In the present embodiment, the user may use the switching module 14 to turn on or off the function of automatically switching the communication modes of the communication device 1. The predetermined electric current value may be configured in advance when the communication device 1 is made during manufacturing phase, or the predetermined electric current value may be configured by the user through the setting module 15.

Figure 2:
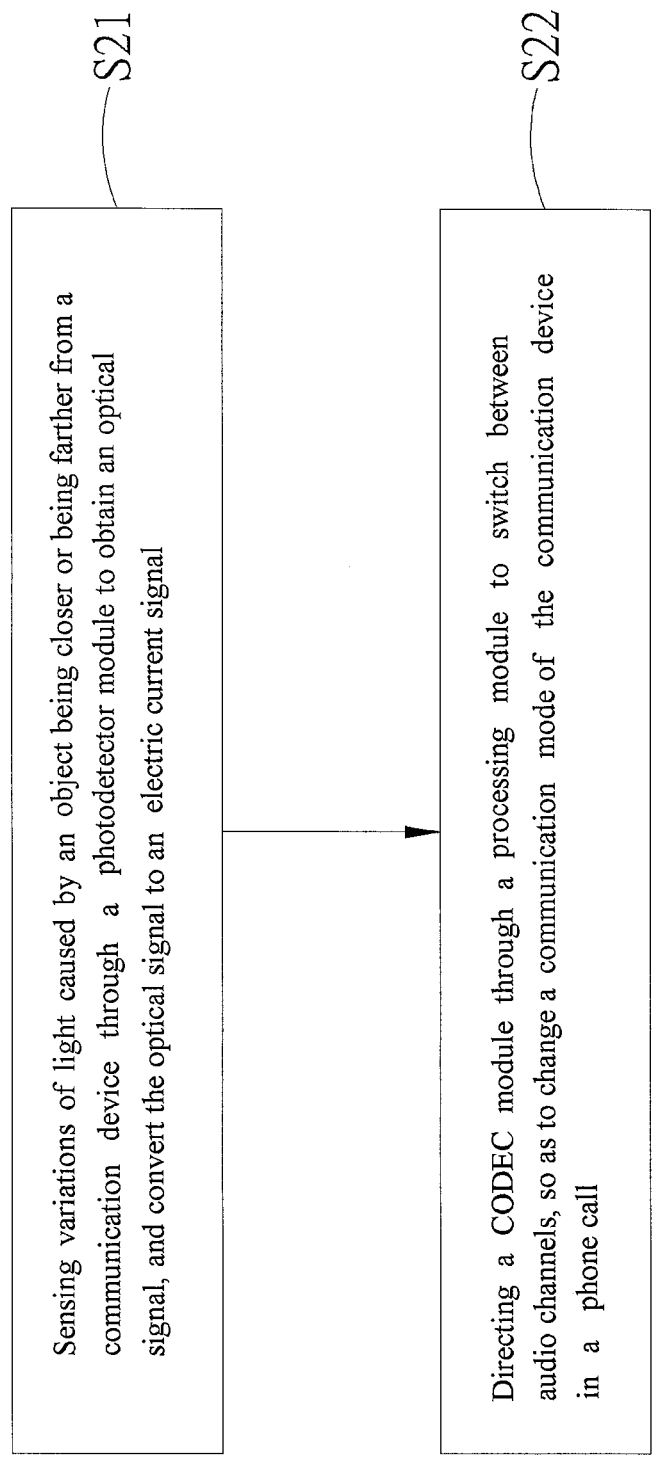
FIG. 2 is a flowchart of a method of operating the communication device for automatically switching its communication modes according to an embodiment of the invention.

Referring to FIG. 2, FIG. 2 is a flowchart of a method of operating the communication device for automatically switching its communication modes according to an embodiment of the invention. The method of operating the communication device for automatically switching its communication modes may include following steps. In step S21, it is to sense variations of light caused by an object being closer or being farther from a communication device through a photodetector module to obtain an optical signal, and convert the optical signal to an electric current signal through the photodetector module. In step S22, it is to direct a CODEC module through a processing module to switch between audio channels of the CODEC module, so as to change a communication mode of the communication device in a phone call.

Figure 3A:
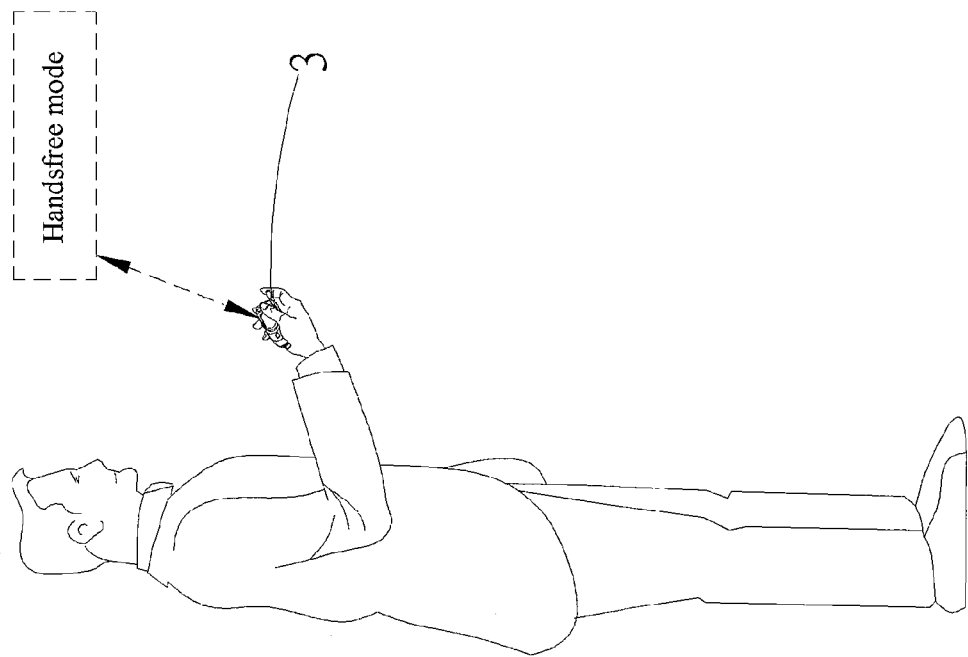
FIG. 3A is a second schematic diagram of a communication device having functions of automatically switching its communication modes and an operating method thereof according to an embodiment of the invention.

Referring to FIG. 3A and FIG. 3B, FIG. 3A and FIG. 3B are a first schematic diagram and a second schematic diagram of a communication device having functions of automatically switching its communication modes and an operating method thereof according to embodiments of the invention. Both FIG. 3A and FIG. 3B may be schematic diagrams illustrating a use scenarios of a user using the mobile phone 3 to perform communication. Before a user performs communication, a predetermined electric current value may be set by the user in a mobile phone 3. Then, the user may turn on or off the function of automatically switching communication modes. Further, when the user is in a phone call, the photodetector in the mobile phone 3 can detect how far or how close the use is from the mobile phone so as to obtain an optical signal. Then, the photodetector can convert the optical signal to an electric current value. Finally, the processor chip in the mobile phone 3 will determine whether the electric current signal has a value greater than the predetermined electric current value, and then switch the communication mode of the mobile phone 3 in a phone call according to the determination result. When the user is farther away from the mobile phone 3, the electric current signal will have a value greater than the predetermined electric current value, the processor chip will control the CODEC module in the mobile phone 3 to switch between its audio channels, so as to switch the communication mode to the handsfree mode, and increase the input gain of the main microphone as shown in FIG. 3A. If the user moves the mobile phone 3 closer to the user, the electric current signal will have a value less than the predetermined electric current value, the processor chip will control the CODEC module in the mobile phone 3 to switch between its audio channels, so as to switch the communication mode to the non-handsfree mode as shown in FIG. 3A.

The photodetector can perform different detection according different types and models of photosensers. For example, the photodetector can emit infrared light, when the user is close to or moves away from the mobile phone 3, the infrared light reflected from the user will have different light strength, thereby generating different electric current values, so as to perform automatically switching the communication modes of the mobile phone 3. Alternatively, the photodetector can sense light in surrounding environments to perform switching the communication modes of the mobile phone 3 (when the user is close to or moves away from the mobile phone 3, the sensed light by the photodetector will be different).

Figure 4:
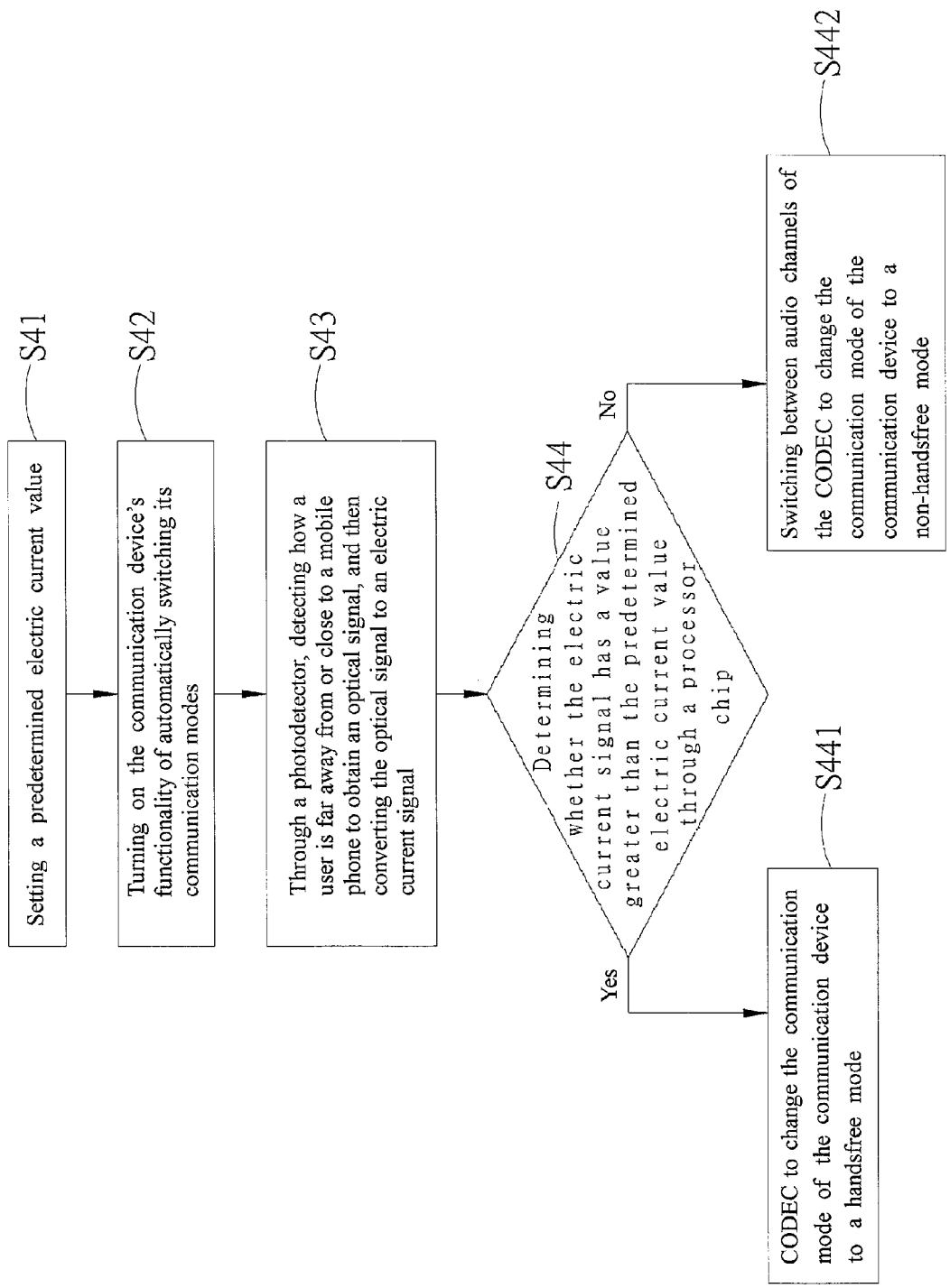
FIG. 4 is a flowchart of a communication device having functions of automatically switching its communication modes and an operating method thereof according to an embodiment of the invention.

Referring to FIG. 4, FIG. 4 is a flowchart of a communication device having functions of automatically switching its communication modes and an operating method thereof according to an embodiment of the invention. The operating method thereof may have following steps: in Step S41, set a predetermined electric current value; in Step S42, turn on the communication device's functionality of automatically switching it communication modes; in Step S43, through a photodetector, detect how a user is far away from or close to a mobile phone to obtain an optical signal, and then converting the optical signal to an electric current signal; in Step S44, determine whether the electric current signal has a value greater than the predetermined electric current value through a processor chip, if yes, then Step S441 is executed, if no, then Step S442 is executed; in Step S441, switch between audio channels of a CODEC to change the communication mode of the communication device to a handsfree mode; in Step S442, switch between audio channels of the CODEC to change the communication mode of the communication device to a non-handsfree mode.

In summary, the communication device having functions of automatically switching its communication modes proposed in the invention performs sensing of light strength through the photodetector and then automatically performs switching its communication modes to the non-handsfree mode or the handsfree mode according to requirements of the user. Therefore, the proposed communication device is quite convenient in operations.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A communication device for automatically switching its communication modes, comprising:
    a photodetector module configured to sense variation of light from an object to obtain an optical signal, and configured to convert the optical signal to an electric current signal, wherein the light varies with a position of the object from the communication device;
    a coder-decoder (CODEC) module; and
    a processing module connected to the photodetector module and configured to direct the CODEC module to switch between audio channels of the communication device according to the electric current signal so as to change a communication mode of the communication device in a phone call.

2. The communication device as claimed in claim 1, wherein the communication mode comprises a handsfree mode or a non-handsfree mode.

3. The communication device as claimed in claim 2, wherein the processing module is configured to determine whether the electric current signal has a value greater than a predetermined electric current value; if it's determined that the value is greater than the predetermined value, the processing module is configured to change the communication mode to the handsfree mode; and if it's determined that the value is not greater than the predetermined value, the processing module is configured to change the communication mode to the non-handsfree mode.

4. The communication device as claimed in claim 3, further comprising a setting module connected to the processing module and providing a user with a function of setting the predetermined value.

5. The communication device as claimed in claim 1, further comprising a switching module connected to the processing module and enabling a user to turn on or off the communication device's function of automatically switching its communication modes.

6. The communication device as claimed in claim 1, comprising a mobile phone.

7. A method of operating a communication device for automatically switching its communication modes, comprising:
    sensing variation of light from an object to obtain an optical signal, and then converting the optical signal to an electric current signal, wherein the light varies with a position of the object from the communication device; and
    directing a coder-decoder (CODEC) module of the communication device to switch between audio channels of the communication device according to the electric current signal so as to change a communication mode of the communication device in a phone call.

8. The operating method as claimed in claim 7, wherein the communication mode comprises a handsfree mode and a non-handsfree mode.

9. The operating method as claimed in claim 8, further comprising:
    determining whether the electric current signal has a value greater than a predetermined electric current value;
    if it's determined that the value is greater than the predetermined value, changing the communication mode to the handsfree mode; and
    if it's determined that the value is not greater than the predetermined value, changing the communication mode to the non-handsfree mode.

10. The operating method as claimed in claim 9, wherein the predetermined value is set by a user using a setting module.

11. The operating method as claimed in claim 7, wherein the communication device's function of automatically switching its communication modes is to be turned on or off by a user using a switching module.

12. The operating method as claimed in claim 7, wherein the communication device comprises a mobile phone.

* * * * *